US007016369B2

(12) United States Patent
Andersson et al.

(10) Patent No.: US 7,016,369 B2
(45) Date of Patent: Mar. 21, 2006

(54) BINDING INFORMATION FOR TELECOMMUNICATIONS NETWORK

(75) Inventors: Staffan Andersson, Enskede (SE); Mikael Agnevik, Nacka (SE); Ola Engström, Bandhagen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 927 days.

(21) Appl. No.: 09/829,451

(22) Filed: Apr. 10, 2001

(65) Prior Publication Data

US 2004/0202172 A1    Oct. 14, 2004

Related U.S. Application Data

(60) Provisional application No. 60/257,116, filed on Dec. 22, 2000.

(51) Int. Cl.
*H04L 12/40* (2006.01)
*G01R 31/108* (2006.01)

(52) U.S. Cl. ........................ 370/440; 370/249
(58) Field of Classification Search ........... 370/249, 370/440

See application file for complete search history.

(56) References Cited

U.S. PATENT DOCUMENTS 4,692,917 A    9/1987    Fujioka (Continued)

FOREIGN PATENT DOCUMENTS

EP    0 405 042 A1    1/1991

(Continued)

OTHER PUBLICATIONS

"ATM User-network Interface (UNI) Signaling Specification", Version 4.0, af-sig-0061.00, Jul. 1996, generated by the ATM Forum Technical Committee.

(Continued)

*Primary Examiner*—Huy D. Vu
*Assistant Examiner*—Cynthia L. Davis
(74) *Attorney, Agent, or Firm*—Nixon & Vanderhye, P.C.

(57) ABSTRACT

Various binding information techniques are provided for a telecommunications network (20) having separated call and connection layers. In a first embodiment of the invention, binding information is associated with connection endpoint information for a first connection end point (36A) at a first end node (22A) of the network. In a second embodiment, an ATM end system address (AESA) is associated with a first connection end point at the first end node and is transmitted in the call layer to the second end node, and included in connection layer signaling sent from the call layer to the connection layer. Upon receipt of the connection layer signaling at the first end node, the first end node uses the AESA to through connect the ATM switch in the physical layer to the first connection endpoint. In a third embodiment, a dynamic ATM end system address (AESA) is associated both with a first end node of the network and with a first connection end point at the first end node. Since the dynamic AESA is reusable for association with other connection end points at the first end node, a table maintained at the first end node keeps track for which end point the dynamic AESA is currently used. In a fourth embodiment, connection endpoint information for a first connection end point of a first end node of the network is included in a vacant or otherwise unused field in an ATM end system address (AESA) of the first end node.

21 Claims, 5 Drawing Sheets

U.S. PATENT DOCUMENTS

| | | | |
|---|---|---|---|
| 4,973,956 | A | 11/1990 | Lin et al. |
| 5,038,343 | A | 8/1991 | Lebizay et al. |
| 5,079,762 | A | 1/1992 | Tanabe |
| 5,126,999 | A | 6/1992 | Munter et al. |
| 5,128,931 | A | 7/1992 | Yamanaka et al. |
| 5,140,582 | A | 8/1992 | Tsuboi et al. |
| 5,144,293 | A | 9/1992 | Rouse |
| 5,150,358 | A | 9/1992 | Punj et al. |
| 5,453,985 | A * | 9/1995 | Ghisler .................. 370/358 |
| 5,467,347 | A | 11/1995 | Petersen |
| 5,491,693 | A | 2/1996 | Britton et al. |
| 5,499,239 | A | 3/1996 | Munter |
| 5,568,479 | A | 10/1996 | Watanabe et al. |
| 5,570,362 | A | 10/1996 | Nishimura |
| 5,623,493 | A | 4/1997 | Kagemoto |
| 5,666,349 | A | 9/1997 | Petri |
| 5,680,390 | A | 10/1997 | Robrock, II |
| 5,710,882 | A | 1/1998 | Svennevik et al. |
| 5,724,348 | A | 3/1998 | Basso et al. |
| 5,740,156 | A | 4/1998 | Tanabe et al. |
| 5,790,541 | A | 8/1998 | Patrick et al. |
| 5,805,804 | A * | 9/1998 | Laursen et al. ............ 709/223 |
| 5,809,129 | A | 9/1998 | Andersson et al. |
| 5,946,309 | A | 8/1999 | Westberg et al. |
| 5,963,553 | A | 10/1999 | Wicklund |
| 5,963,564 | A | 10/1999 | Petersen et al. |
| 5,987,515 | A | 11/1999 | Ratcliff et al. |
| 6,009,103 | A | 12/1999 | Woundy |
| 6,034,958 | A | 3/2000 | Wicklund |
| 6,088,359 | A | 7/2000 | Wicklund et al. |
| 6,128,295 | A | 10/2000 | Larsson et al. |
| 6,154,459 | A | 11/2000 | Wicklund |
| 6,195,714 | B1 * | 2/2001 | Li et al. .................. 710/31 |
| 6,373,853 | B1 * | 4/2002 | Yoshida .................. 370/465 |
| 6,381,246 | B1 * | 4/2002 | Constantinof et al. ...... 370/410 |
| 6,741,585 | B1 * | 5/2004 | Munoz et al. ............. 370/352 |

FOREIGN PATENT DOCUMENTS

| | | |
|---|---|---|
| EP | 0 631 456 A | 12/1994 |
| EP | 0 800 324 A2 | 10/1997 |
| EP | 0 827 305 A1 | 3/1998 |
| GB | 2 314 995 A | 1/1998 |
| WO | 93/19559 | 9/1993 |
| WO | 95/30318 | 11/1995 |
| WO | 96/34478 | 10/1996 |
| WO | 97/41696 | 11/1997 |
| WO | 97/33406 | 12/1997 |
| WO | 01/91399 A2 | 11/2001 |

OTHER PUBLICATIONS

ATM Adaptation Layer Switching, Mauger et al, XVI World Telecom Congress Proceedings (XP-000720525) (pp. 207-214).

U.S. Appl. No. 09/188,101, filed Nov. 9, 1998, "Asynchronous Transfer Mode".

U.S. Appl. No. 09/188,102, filed Nov. 9, 1998, Asynchronous Transfer Mode System Handling Differing AAL Protocol.

U.S. Appl. No. 09/249,785, filed Feb. 19, 1999, entitled "Establishing Internal Control Paths In ATM Node".

Mauger et al, "QoS Guarantees for Multimedia Services on a TDMA-Based Satellite Network", IEEE Communications Magazine, Jul. 1997, pp. 60-65.

Doi et al, "A High-Speed ATM Switch Architecture for FTTH—An ATM Switch Architecture with Input and Cross-Point Buffers", ISS '95, World Telecommunications Congress (International Switching Symposium), Advanced Switching Technologies for Universal Telecommunications at the Beginning of the 21$^{st}$ Century, Berlin, Apr. 23-28, 1995, vol. 1, No. SYMP 15, Apr. 23, 1995, pp. 384-388.

Weller et al., "Scheduling Nonuniform Traffic in a Packet Switching System with Small Propagation Delay", Proceedings of the Conference on Computer Communications (INFOCOM), Toronto, Jun. 12-16, 1994, vol. 3, Jun. 12, 1994, pp. 1344-1351.

Eneroth et al, "ATM Transport in Cellular Networks", Iss '97, World Telecommunications Congress (International Switching Symposium), Global Network Evolution: Convergence or Collision? Toronto, Sep. 21-26, 1997, vol. 2, Sep. 21, 1997, pp. 139-146.

Saito et al, "Layered Cell Structure for ATM Networks", 1996 IEEE International Conference on Communications (ICC), Converging Technologies for Tomorrow's Applications, Dallas, Jun. 23-27, 1996, vol. 3, Jun. 23, 1996, pp. 1254-1257.

McTiffin et al, "Mobile Access to an ATM Network Using a CDMA Air Interface", IEEE Journal on Selected Areas in Communications, vol. 12, No. 5, Jun. 1, 1994, pp. 900-908.

Baldwin et al, "AAL-2—A new ATM Adaptation Layer for Small Packet Encapsulation and Multiplexing", Bell Labs Technical Journal, vol. 2, No. 2, Mar. 21, 1997, pp. 111-131.

Stephens et al, "Large-Scale ATM Switching Systems for B-ISDN", IEEE Journal, vol. 9, No. 8, Oct. 1991, pp. 1157-1160.

Chao, "A Recursive Modular Terabit/Second ATM Switch", IEEE Journal, vol. 9, No. 8, Oct. 1991, pp. 1161-1172.

Tobagi et al, "Architecture, Performance, and Implementation of the Tandem Banyan Fast Packet Switch" IEEE Journal, vol. 9, No. 8, Oct. 1991, pp. 1173-1193.

Urushidani, "Rerouting Network: A High-Performance Self-Routing Switch for B-ISDN", IEEE Journal, vol. 9, No. 8, Oct. 1991, pp. 1194-1204.

Yang et al., "A Reconfigurable ATM Switch Fabric for Fault Tolerance and Traffic Balancing", IEEE Journal vol. 9, No. 8, Oct. 1991, pp. 1205-1217.

Itoh, "A Fault-Tolerant Switching Network for B-IDSN", IEEE Journal, vol. 9, No. 8, Oct. 1991, pp. 1218-1226.

Banwell et al., "Physical Design Issues for Very Large ATM Switching Systems", IEEE Journal, vol. 9, No. 8, Oct. 1991, pp. 1227-1238.

Kozaki et al, "32×32 Shared Buffer Type ATM Switch VLSI's for B-ISDN's", IEEE Journal, vol. 9, No. 8, Oct. 1991, pp. 1239-1247.

Shobatake et al, "A One-Chip Scalable 8 * 8 ATM Switch LSI Employing Shared Buffer Architecture", IEEE Journal, vol. 9, No. 8, Oct. 1991, pp. 1248-1254.

Banniza et al, "Design and Technology Aspects of VSLI's for ATM Switches", IEEE Journal, vol. 9, No. 8, Oct. 1991, pp. 1255-1264.

Katevenis et al, "Weighted Round-Robin Cell Multiplexing in a General-Purpose ATM Switch Chip", IEEE Journal, vol. 9, No. 8, Oct. 1991, pp. 1265-1279.

Giacopelli et al, "Sunshine: A High-Performance Self-Routing Broadband Packet Switch Architecture", IEEE Journal, vol. 9, No. 8, Oct. 1991, pp. 1289-1298.

Fischer et al, "A Scalable ATM Switching System Architecture", IEEE Journal, vol. 9, No. 8, Oct. 1991, pp. 1299-1307.

Matsunaga et al, "A 1.5 Gb/s 8×8 Cross-Connect Switch Using a Time Reservation Algorithm" IEEE Journal, vol. 9, No. 8, Oct. 1991, pp. 1308-1317.

Schroeder et al, "Autonet: A High-Speed, Self-Configuring Local Area Network Using Point-to-Point Links", IEEE Journal, vol. 9, No. 8, Oct. 1991, pp. 1318-1335.

Stavrakakis, "Efficient Modeling of Merging and Splitting Processes in Large Networking Structures", IEEE Journal, vol. 9, No. 8, Oct. 1991, pp. 1336-1347.

Cisneros et al, "A Large ATM Switch Based on Memory Switches and Optical Star Couplers", IEEE Journal, vol. 9, No. 8, Oct. 1991, pp. 1348-1360.

Itoh et al, "Practical Implementation and Packaging Technologies for a Large-Scale ATM Switching Systems", IEEE Journal, vol. 9, No. 8, Oct. 1991, pp. 1280-1288.

Veeraraghavan et al, "Parallel Connection Control (PCC) Algorithm for ATM Networks", 1996 IEEE Int'l. Conference on Communications (ICC), Converging Technologies for Tomorrow's applications, Dallas, Jun. 23-27, 1996, New York, vol. 3, Jun. 23, 196, pp. 1635-1641.

Fritz, "Demystifying ATM Addressing", BYTE, McGraw-Hill Inc., St. Petersborough, US, vol. 22, No. 12, Dec. 1, 1997, pp. 57-58.

International Preliminary Examination mailed Jan. 28, 2003 in corresponding PCT Application No. PCT/SE01/02819.

* cited by examiner

BINDING INFORMATION FOR TELECOMMUNICATIONS NETWORK

This application claims the priority and benefit of U.S. Provisional Patent Application Ser. No. 60/257,116, filed Dec. 22, 2000 (2380-187), entitled "Binding Information For Telecommunications Network", which is incorporated herein by reference in its entirety.

FIELD OF THE INVENTION

This invention pertains to telecommunications, and particularly to telecommunications network having separated call and connection layers.

BACKGROUND AND SUMMARY

Telecommunications networks are typically conceptualized as having layered functionalities. The physical layer comprises a network of switches and cables (e.g., trunk lines) which are employed to connect devices (e.g., telephones) involved in a call (e.g., a "connection"). The connection layer is an abstraction that comprises a model of the physical network. Connection handling (which is performed over the connection layer) relates to the set up and release of connections and to the control of the physical telecommunications network. The call layer is involved in service handling, which includes service control, service execution, service signaling, service installation, service modification, and service administration. Within each layer information is transferred over signaling entities within the layer.

In some telecommunication systems, the call layer information and the connection layer information is signaled and routed along the same path from a call origin to a call destination. In such case, the resources needed for the call establishment are reserved hop by hop (e.g., as the information is signaled and routed from switch to switch through the physical network). As the call layer and connection layer are therefore closely coupled to each other, the binding between the call layer and the connection layer is resolved in runtime.

Modern telecommunication networks usually have the call layer and the connection layer separated from one another. As a consequence of the separation of the call layer and the connection layer, different networks are used for the call establishment and the connection establishment. The two networks (the call layer network and the connection layer network) usually have different topologies.

In operation, in setting up a call usually a call layer connection is initially established over the call layer network between two devices. Typically establishing the call layer connection involves exchange of control information that does not need any user plane (e.g., physical layer) connection. Subsequently, when a user plane connection is needed over the physical layer, a connection is established in the connection layer.

The two connections—the call layer connection and the connection layer connection—are routed from the same origin to the same destination. However, in view of the differing topologies of the call layer network and the connection layer network, the two connections do not have to be routed along the same path. The advantage of separate routing of the call layer connection and the connection layer connection is that resources for the user plane connection are only reserved and used when needed. Examples of call and connection separated telecommunications networks are provided in the following, all of which are incorporated herein by reference in their entirety: Swedish Patent Application 9601605-0, filed Apr. 26, 1996; U.S. Pat. No. 5,809,129; and, U.S. Pat. No. 5,710,882.

The separation of the call layer and the connection layer does, however, require some type of mechanism to bind the two layers to each other at certain nodes where the two layers meet. The signaling protocol of each layer needs to carry the binding mechanism, e.g., binding information. Typically, existing networks with existing protocols are used, and the binding information must be fit into already defined information entities within those protocols.

In the above regard, both in a core network and in a radio access network, the call layer generally uses a signaling system No. 7 (SS7) network or a TCP/IP network for call control signaling. On top of the SS7 or the TCP/IP protocol stacks there is an application protocol, such as RNSAP or RANAP. The RNSAP and RANAP protocols are used end-to-end in the network. Application specific resources, such as diversity handover units (DHOs) and codecs (coders/decoders) are handled and reserved at the call layer.

The present invention provides various binding information techniques when the call and the connection layers are separated in a telecommunications network. In a first embodiment of the invention, binding information is associated with connection endpoint information for a first connection end point at a first end node of the network. The connection endpoint information for the first connection end point can be vendor specific for a physical layer entity at the first end node, and may take the form of a concatenation of one or more of a node identifier, a hardware cabinet rack, a hardware slot, a hardware port, and a resource. The binding information and an ATM end system address (AESA) of the first end node are transmitted through the call layer to a second end node of the network. A second connection end point is reserved at the second end node, and a connection request is sent from the call layer to the connection layer. The connection request includes the binding information and the AESA of the first end node. Connection layer signaling which includes both the binding information and the AESA of the first end node is routed through the connection layer to the first end node. At the first end node, the binding information included in the connection layer signaling is used to obtain the connection endpoint information for the first connection end point. The connection layer then sends appropriate signals to through connect a switch in the physical layer of the first end node in accordance with the connection endpoint information for the first connection endpoint.

In one mode of the first embodiment, the binding information can be obtained by the call layer from a conversion table handled by the connection layer. The conversion table translates binding information and connection end point information. In another mode of the first embodiment, the conversion table is handled by the call layer. In this second mode of the first embodiment, upon receipt of the connection layer signaling at the first end node the binding information is sent to the call layer. The call layer obtains the connection endpoint information for the first connection endpoint from the conversion table in the call layer, and orders the connection layer to through connect the switch in the physical layer of the first end node in accordance with the connection endpoint information for the first connection endpoint.

In a second embodiment, an ATM end system address (AESA) is associated with a first connection end point at the first end node, and that ATM end system address (AESA) is transmitted in the call layer to the second end node whereat a second connection end point is reserved. A connection request is sent from the call layer to the connection layer, and connection layer signaling is routed through the connection layer to the first end node using the ATM end system address (AESA) associated with a first connection end point. The connection layer signaling includes the ATM end system address (AESA) associated with a first connection end point. Upon receipt of the connection layer signaling at the first end node, the first end node uses the ATM end system address (AESA) associated with a first connection end point to through connect the ATM switch in the physical layer to the first connection endpoint.

In a third embodiment, a dynamic routing number is associated both with a first end node of the network and with a first connection end point at the first end node. The dynamic routing number is preferably a dynamic AESA. Since the dynamic routing number (e.g., AESA) is reusable for association with other connection end points at the first end node, a table maintained at the first end node keeps track for which end point the dynamic routing number is currently used. The dynamic routing number is transmitted in the call layer to the second end node of the network. A second connection end point is reserved at the second end node, and a connection request is sent from the call layer to the connection layer. The connection request includes the dynamic routing number. Using the dynamic routing number included therein, connection layer signaling is routed through the connection layer from the second end node to the first end node. At the first end node, the dynamic routing number included in the connection layer signaling is used to obtain the first connection end point. The switch in the physical layer of the first end node is through connected in accordance with the first connection endpoint currently associated with the dynamic routing number.

In a fourth embodiment, connection endpoint information for a first connection end point of a first end node of the network is included in a vacant or otherwise unused field in an ATM end system address (AESA) of the first end node. The AESA of the first end node is transmitted in the call layer to a second end node of the network. A second connection end point is reserved at the second end node. A connection request is sent from the call layer to the connection layer. The connection request includes the AESA of the first end node. Connection layer signaling (which also includes the AESA of the first end node) is routed through the connection layer to the first end node. At the first end node, the connection endpoint information for the first connection end point of the first end node (included in the AESA of the first end node) is used to through connect the ATM switch in the physical layer to the first connection endpoint.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
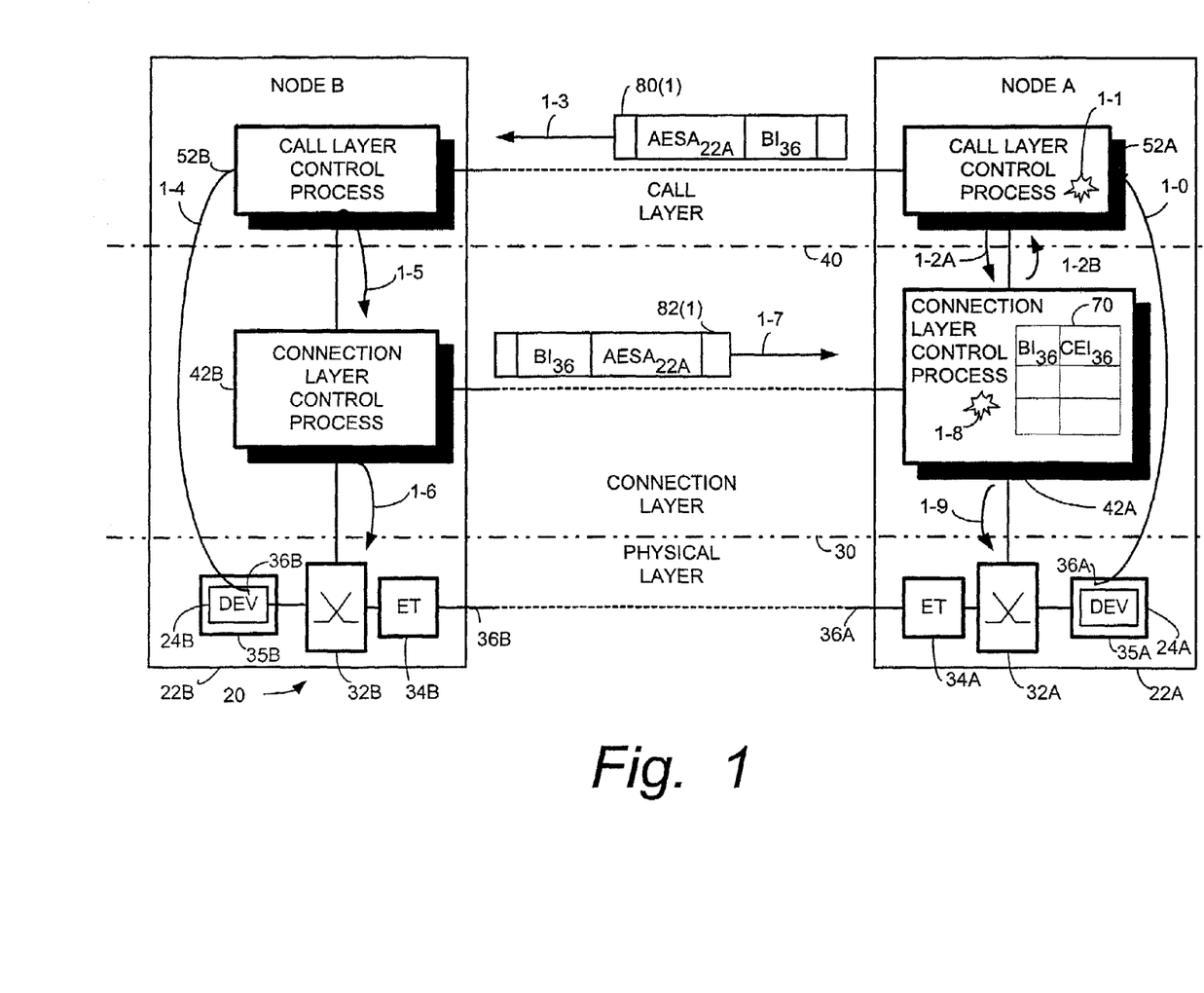
FIG. 1 is a diagrammatic view of a telecommunications network utilizing a call layer and connection layer binding scheme according to a first mode of a first embodiment of the invention.

The present invention is described in the context of the example, non-limiting telecommunications network 20 shown in FIG. 1. The telecommunications network 20 can be any suitable network, such as a core network or a radio access network (such as the UTRAN for a third generation wideband code division multiple (WCDMA) radio access network). FIG. 1 illustrates only two nodes of telecommunications network 20, particularly node 22A (also known as Node A) and node 22B (also known as Node B). In the embodiments described herein, for sake of illustration it will be assumed that a call or connection is to be made between a device 24A connected to node 22A and a device 24B connected to node 22B. In view of this illustrative assumption, node 22A and node 22B are referred to herein as "end nodes". The devices 24A and 24B can be network devices, such as diversity handover devices and codecs, for example.

The telecommunications network 20 has a physical layer which is illustrated in FIG. 1 as being below dashed double-dotted line 30. The physical layer comprises a network of switches and cables or links (e.g., trunk lines) which are employed to connect devices such as devices 24A and 24B. Two such switches 32A and 32B are shown in FIG. 1, with switch 32A being situated at end node 22A and switch 32B being situated at end node 22B.

To certain switch ports of switch 32A which are outgoing from end node 22A are connected extension terminals 34A, only one such extension terminal 34A being shown in FIG. 1 for sake of simplification. Likewise, the outgoing switch ports of switch 32B are connected to extension terminals 34B. As is understood to those skilled in the art, it is through extension terminals such as extension terminal 34A and extension terminal 34B that a switch 32 of a node in the physical layer is connected in the physical layer to other nodes. Various aspects of extension terminals (sometimes referred to as "exchange terminals") are described, e.g., in one or more of the following (all of which are incorporated herein by reference: U.S. Pat. Nos. 6,128,295; 6,088,359; 5,963,553; 6,154,459; and 6,034,958. For example, each extension terminal 34 may be connected to one or more (e.g., four) cables or links to other nodes of telecommunications network 20.

The person skilled in the art will appreciate that the telecommunications network typically includes many unillustrated nodes other than nodes 22A and 22B. FIG. 1 shows, on the one hand, extension terminal 34A being connected to a link 36A leading externally from node 22A, and on the other hand shows extension terminal 34B being connected to a link 36B leading externally from node 22B. While it is possible that extension terminal 34A and extension terminal 34B can be connected directly (e.g., link 36A and link 36B being essentially the same link), it is more likely that links 36A and 36B are instead connected indirectly via other unillustrated nodes of the telecommunications network 20, for which reason links 36A and 36B are shown as broken lines in FIG. 1.

A switch such as switch 32A in node 22A and switch 32B in node 22B has plural switch ports. A switch port can have an extension terminal connection thereto as above described. Alternatively, a switch port can have a device card or device board 35 connected thereto. FIG. 1 shows a device board 35A connected to a switch port of switch 32A and device board 35B connected to a switch port of switch 32B. Each device board 35 can house or have mounted thereon several devices. For sake of simplicity, FIG. 1 shows only one device mounted on each switch board, e.g., device 24A mounted on device board 35A and device 24B mounted on device board 35B. Each device 24 can, in turn, accommodate or house several connection endpoints. For example, a diversity handover device can handle four connection endpoints (e.g., comparing information received on three connection endpoints from up to three base stations and then forwarding the best received signal to the core network using a fourth connection endpoint). Again for sake of ease of illustration, only one connection endpoint is shown for each device board 35, e.g., connection endpoint 36A in device board 35A and connection endpoint 36B in device board 35B.

The information used to identify a connection endpoint, known herein as connection endpoint information, varies from switch to switch, and depends on conventions of the switch vendor/manufacturer. The connection endpoint information can thus be vendor specific for a physical layer entity, and may take the form of a concatenation of one or more of a node identifier, a hardware cabinet rack, a hardware slot, a hardware port, and a resource, for example.

In the illustrated telecommunications network 20, the switches 32 of the physical layer are Asynchronous Transfer Mode (ATM) switches. Various aspects of ATM-based telecommunications and represented example utilizations are described in the following: U.S. patent application Ser. No. 09/188,101 [PCT/SE98/02325] and Ser. No. 09/188,265 [PCT/SE98/02326] entitled "Asynchronous Transfer Mode Switch"; U.S. patent application Ser. No. 09/188,102 [PCT/SE98/02249] entitled "Asynchronous Transfer Mode System", both of which are incorporated herein by reference.

The telecommunications network 20 has a separation between its connection layer and its call layer. The connection layer is shown in FIG. 1 above the physical layer, e.g., between dashed double-dotted line 30 and dash dotted line 40. In each node of telecommunications network 20, the connection layer includes a connection layer control process. For example, a connection layer control process 42A is illustrated in FIG. 1 for node 22A, while a connection layer control process 42B is illustrated for node 22B.

The call layer is shown in FIG. 1 above the connection layer, e.g., above dash dotted line 40. In each node of telecommunications network 20, the call layer includes a connection layer control process. Again by way of example, a call layer control process 52A is illustrated in FIG. 1 for node 22A, while a call layer control process 52B is illustrated for node 22B.

In general, whenever a user plane connection is needed to be set up in the physical layer, an order is given in the form of a connection request from the call layer to the connection layer. The connection endpoints of the application specific resources must be addressable at the connection layer. The connection is established using an appropriate connection layer signaling protocol, e.g., B-ISUP signaling for ATM connections or Q.AAL2 for AAL2 connections. The connection layer signaling is routed through the connection layer and controls reservation and through connection of connection layer resources (e.g., switches and extension terminals) along the path to the destination end node.

In accordance with the general scheme as summarized above, the present invention provides various binding information techniques when the call and the connection layers are separated in a telecommunications network such as telecommunications network 20, e.g., in a telecommunications network in which the call layer and the connection layer utilize differing signaling entities in the physical layer. Four embodiments of binding information techniques are described with reference to FIG. 1–FIG. 4, respectively.

Some of the embodiments described herein utilize or refer to an ATM end system address (AESA). The concept of ATM end system address is described, e.g., in section 3.0 of ATM User-Network Interface (UNI) Signaling Specification, Version 4.0, af-sig-0061.00, July 1996, generated by the ATM Forum Technical Committee, which specifies the use of standard ATM addresses for private and public networks. In general, an AESA has an initial domain part (IDP) and a domain specific part (DSP). The initial domain part (IDP) comprises two fields: the authority and format identifier (AFI) and the initial domain identifier (IDI). The domain specific part (DSP) is subdivided into a high order DSP (HO-DSP) and a low order part which consists of the end system identifier (ESI) and a selector (SEL).

First Embodiment

In a first embodiment of the invention, described with reference to basic actions shown in FIG. 1, one AESA per node is utilized, along with binding information to bind the connection to a connection endpoint. As action 1-1, at node 22A the call layer (more specifically call layer control process 52A) reserves a connection endpoint (e.g., connection endpoint 36A) in response to a request (action 1-0) by device 24A to set up a call with device 24B. The connection endpoint is described by connection endpoint information which, as mentioned above, can be vendor specific information. In FIG. 1, the connection endpoint information is represented by $CEI_{36}$.

As action 1-2A and action 1-2B, the call layer requests and obtains from the connection layer certain binding information which is associated with the connection endpoint information for the first connection end point at node 22A. In one version of the first embodiment, action 1-2A can be performed by, e.g., by call layer control process 52A requesting, from connection layer control process 42A, binding information (denoted as $BI_{36}$ in FIG. 1) which is associated with the connection endpoint information $CEI_{36}$ for connection endpoint 36A. The connection layer control process 42A maintains a table 70 which keeps track of what binding information identifier (e.g., $BI_{36}$) is associated with the connection endpoint information for the connection endpoint for which binding information is requested by action 1-2A. Action 1-2B shows the binding information associated with the connection endpoint information being returned by connection layer control process 42A to call layer control process 52A.

To some extent, the binding information utilized in the first embodiment is standardized for Q.AAL2. In particular, the binding information is standardized in ITU-T Q.2630.1 to be a fixed size field of four octets. The binding information is named "Served User Generated Reference" (SUGR) in the Q.2630.1 specification. However, the ITU-T Q.2630.1 standard does not limit or imply anything regarding how those values are assigned to the SUGR.

As action 1-3 the call layer control process 52A of the end node 22A transmits a call layer signaling message to end node 22B. In this first embodiment of the invention, the call layer signaling message 80(1) of action 1-3 includes the binding information and an ATM end system address (AESA) of end node 22A, depicted as $AESA_{22}A$ in FIG. 1. The call layer signaling message 80(1) of action 1-3 can be in the form of an appropriate existing protocol, such as RANAP, RNSAP, and NBAP when the telecommunications network 20 is a radio access network known as UTRAN. In any call and connection separated network the call layer must extend this information in order to make it possible for the connection layer to route the connection. As is understood generally and illustrated subsequently, the AESA of end node 22A carried in the call layer signaling message 80(1) is used for signal routing to end node 22A.

Upon receipt of the call layer signaling message 80(1), as action 1-4 the call layer control process 52B of end node 22B reserves a connection endpoint for the call to device 24B. As explained previously, the connection endpoint is a user plane service access point on the device. As illustrated in FIG. 1, the particular connection endpoint on device 24B reserved by action 1-4 is connection endpoint 36B. Thereafter, as action 1-5, the call layer control process 52B sends a connection request message or primitive to the connection layer. The connection request message sent to the connection layer as action 1-5 includes the AESA of end node 22A, the binding information ($BI_{36}$), and the connection endpoint reserved at action 1-3 (e.g., connection endpoint $36_B$).

As a result of receipt of the connection request of action 1-5, as action 1-6 the connection layer control process 42B handles the extension terminal 34B and through connects switch 32B so that endpoint 36B is connected to extension terminal 34B. This handling involves resource handling, such as (for example) reserving CID and bandwidth on an available AAL2 path in the AAL2 case.

Action 1-7 involves the routing of connection layer signaling through the connection layer from end node end node 22B to end node 22A. The connection layer signaling, depicted as message 82(1) in FIG. 1, includes the binding information ($BI_{36}$) and the AESA of end node 22A (e.g., $AESA_{22A}$). The connection layer signaling message 82(1) can be in any of several protocols, including Q.AAL2, B-ISUP, and PNNI.

Upon receipt of the connection layer signaling (e.g., message 82(1)), the connection layer control process 42A in the connection layer at end node 22A accesses the binding information (e.g., $BI_{36}$) included therein. Using the binding information obtained from the connection layer signaling, as action 1-8 the connection layer control process 42A accesses table 70 to obtain the appropriate connection endpoint information, i.e., the connection endpoint information $CEI_{36}$ for connection endpoint 36A. Then, using the vendor-specific connection endpoint information $CEI_{36}$ acquired from table 70, the connection layer control process 42A issues signals to through connect switch 32A, so connection endpoint associated with the connection endpoint information $CEI_{36}$ is through connected to device 24A.

In addition to the foregoing, when the connection layer signaling message 82(1) reaches its destination, e.g., end node 22A, end node 22A signals back to the originating node (e.g., end node 22B) with a confirmation of receipt, and hence of establishment of the connection. The confirmation indicates that the path through the connection layer is through connected. The end node 22A does not necessarily have to know the source address of the connection (e.g., the source address of end node 22B).

What has been described above with reference to FIG. 1 is but a first of several alternative modes or implementations of the first embodiment. In the first mode of FIG. 1, the binding information is obtained by the call layer from conversion table 70 (see action 1-2A and action 1-2B), with conversion table 70 being handled by the connection layer.

Figure 1A:
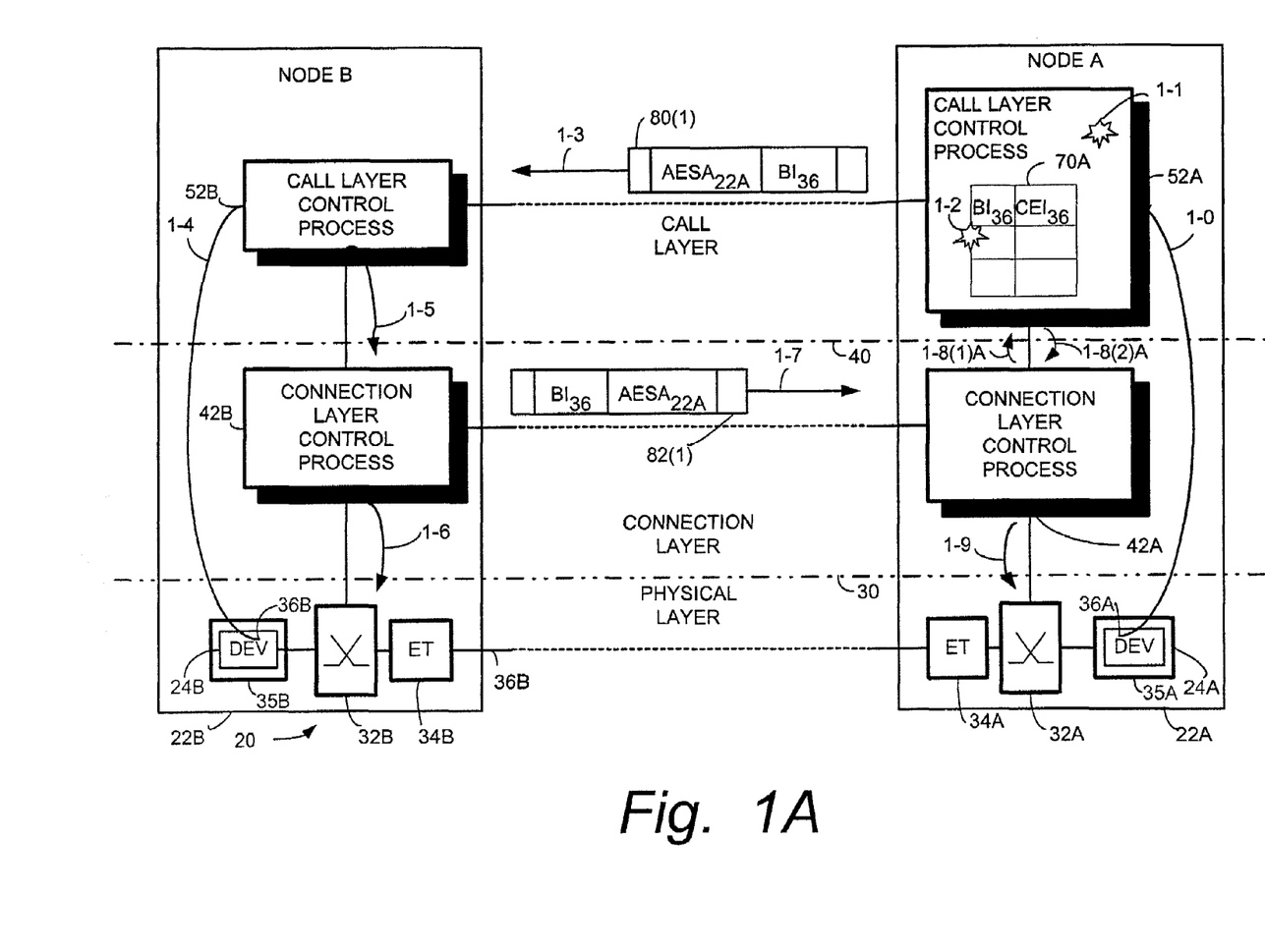
FIG. 1A is a diagrammatic view of a telecommunications network utilizing a call layer and connection layer binding scheme according to a second mode of a first embodiment of the invention.

In another mode of the first embodiment, illustrated in FIG. 1A, the conversion table 70A is instead handled by the call layer, e.g., by call layer control process 52A. Accordingly, action 1-2 involves call layer control process 52A obtaining the binding information for the connection endpoint. Moreover, in this second mode of the first embodiment, upon receipt of the connection layer signaling which is sent to the first end node as action 1-7, at the first end node the connection layer control process 42A sends the binding information to the call layer, e.g., to call layer control process 52A as depicted by action 1-8(1)A. The call layer then obtains the connection endpoint information for the first connection endpoint from the table 70A which is maintained by the call layer. Further, as action 1-8(2)A the call layer and orders the connection layer to through connect the switch in the physical layer of the first end node in accordance with the connection endpoint information retrieved from table 70A. Action 1-9 of FIG. 1A shows the connection layer directing the through connecting of the switch 32A.

The first embodiment of the invention advantageously requires only the one AESA address—$AESA_{22A}$—to be transported. Moreover, the binding information can be generic, and the conversion of the binding information to a vendor-specific connection endpoint address is performed within the node. For the first embodiment, the signaling standards must be able to accommodate the binding information.

Second Embodiment

Figure 2:
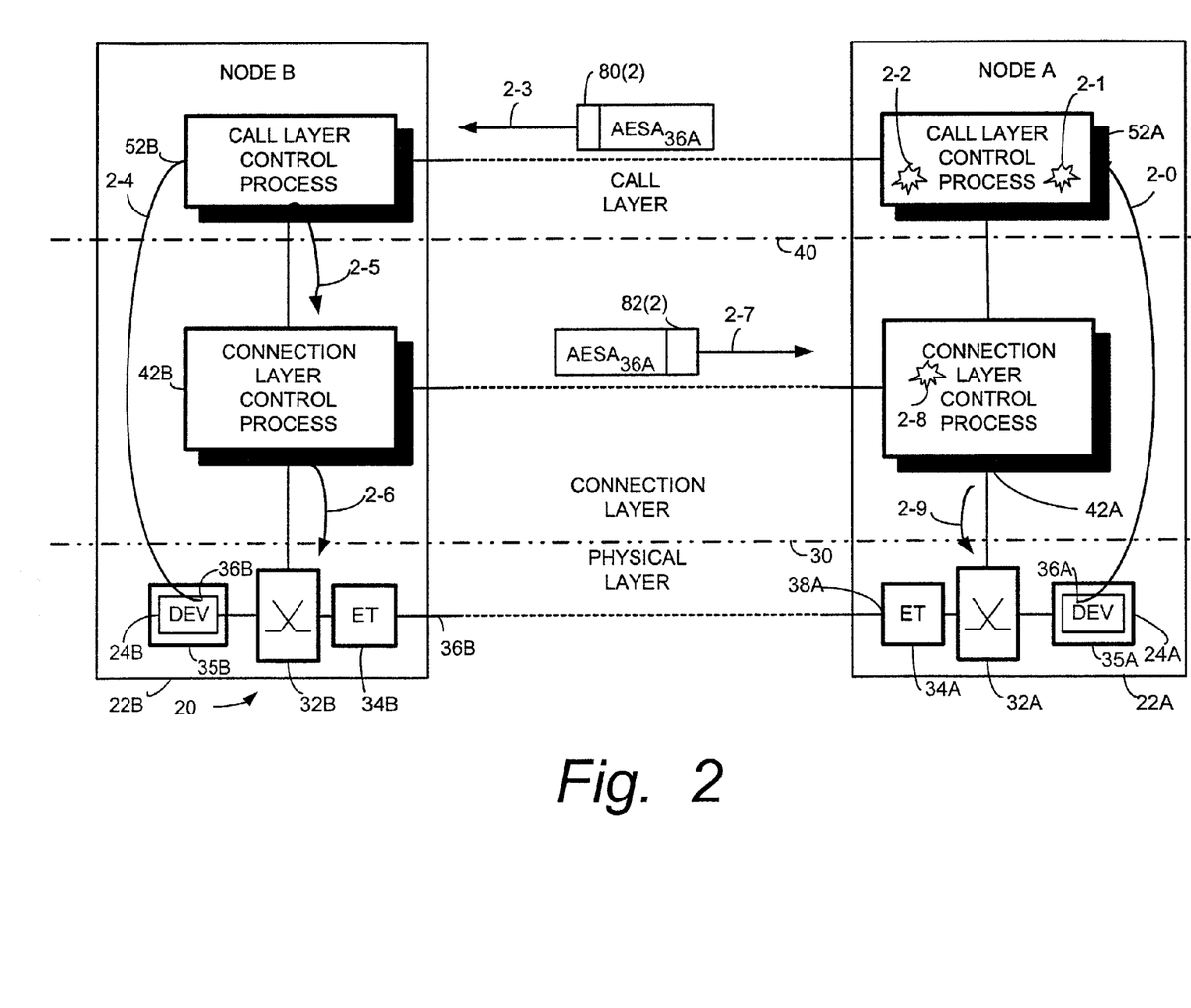
FIG. 2 is a diagrammatic view of a telecommunications network utilizing a call layer and connection layer binding scheme according to a second embodiment of the invention.

The second embodiment is illustrated in FIG. 2, which employs similarly referenced elements as FIG. 1. In the second embodiment, an ATM end system address (AESA) is associated with a first connection end point at the first end node. In terms of FIG. 2, $AESA_{36A}$ is the ATM end system address (AESA) which is associated with a first connection end point (e.g., connection endpoint 36A).

In accordance with operation of the second embodiment, as action 2-1 the call layer (more specifically call layer control process 52A of node 22A) reserves a connection endpoint (e.g., connection endpoint 36A) in response to a request (action 2-0) by device 24A to set up a call with device 24B. Then, as action 2-2, the call layer control process 52A determines the AESA for the first connection endpoint 36A. Such determination or assigning of an AESA to each connection endpoint can occur by management operation or (more preferably) an internal algorithm which, at start up of the node, assigns AESAs within an address range to the connection endpoints of the node.

As action 2-3 the call layer control process 52A of the end node 22A transmits a call layer signaling message to end node 22B. In this second embodiment of the invention, the call layer signaling message 80(2) of action 2-3 includes the AESA (AESA$_{36A}$). Again, as is the case with all other embodiments herein specifically described, the call layer signaling message 80(2) of action 2-3 can be in the form of an appropriate existing protocol, such as RANAP, RNSAP, and NBAP when the telecommunications network 20 is a radio access network known as UTRAN.

Upon receipt of the call layer signaling message 80(2), as action 2-4 the call layer control process 52B of end node 22B reserves a connection endpoint for the call to device 24B. As illustrated in FIG. 2, the particular connection endpoint reserved by action 2-4 is connection endpoint 36B. Thereafter, as action 2-5, the call layer control process 52B sends a connection request message to the connection layer. The connection request message sent to the connection layer as action 2-5 includes the AESA (the AESA$_{36A}$ of the first connection endpoint 36A). As a result of receipt of the connection request of action 2-5, as action 2-6 the connection layer control process 42B handles the extension terminal 34B and through connects switch 32B so that endpoint 36B is connected to extension terminal 34B.

Action 2-7 involves the routing of connection layer signaling through the connection layer from end node end node 22B to end node 22A. The connection layer signaling, depicted as message 82(2) in FIG. 2, includes the AESA$_{36A}$ of the first connection endpoint 36A. In fact, the AESA$_{36A}$ is used as the ultimate address for routing the connection layer signaling. Upon receipt of the connection layer signaling (e.g., message 82(1)), as reflected by action 2-8 the connection layer control process 42A in the connection layer at end node 22A knows to what connection endpoint the connection layer signaling message pertains in view of the AESA included therein. The connection layer control process 42A uses the AESA to issue a command (action 2-9) to switch 32A so as to through connect the ATM switch to the first connection endpoint, e.g., to the connection endpoint 36A for device 24A.

An advantage of this second embodiment is that the signaling standards need not support binding information of the type of the first embodiment. Thus, the second embodiment can be used when the call layer signaling cannot carry a binding information attribute. However, the second embodiment does require an AESA address for each connection endpoint, which also has to be configured or assigned as above described.

Third Embodiment

The third example embodiment is illustrated in FIG. 3, which again employs similarly referenced elements as FIG. 1. In the third embodiment, one ATM end system address (AESA), known as a dynamic AESA, is associated both with a first end node of the network and with a first connection end point at the first end node. The dynamic AESA is reusable for association with other connection end points at the first end node for other calls. In view of this potentially repeated use of a particular dynamic AESA value for other connection end points for other calls, a table 70C is maintained at the first end node for keeping track for which connection end point any particular dynamic AESA is currently being used.

Figure 3:
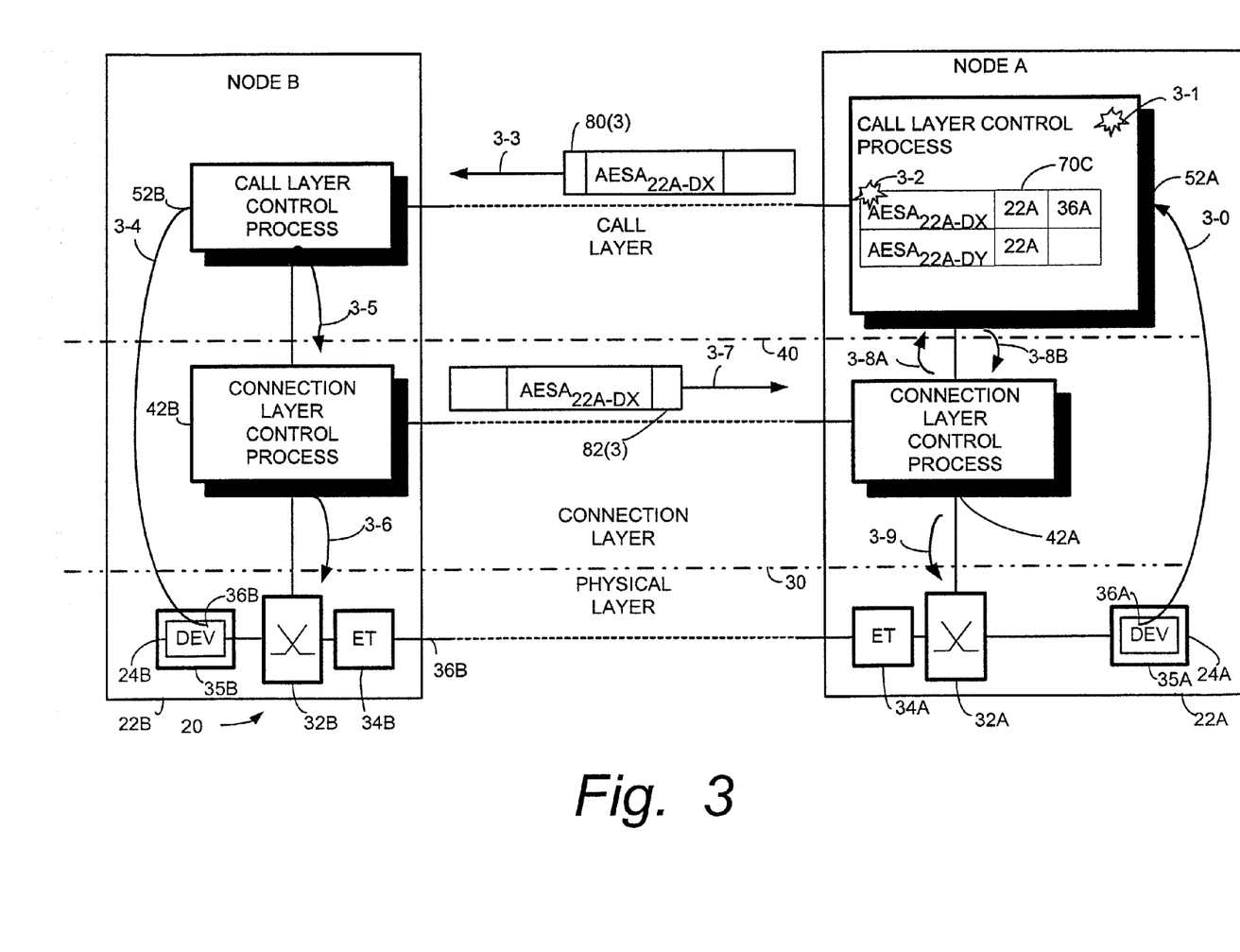
FIG. 3 is a diagrammatic view of a telecommunications network utilizing a call layer and connection layer binding scheme according to a third embodiment of the invention.

Table 70C as shown in FIG. 3 lists several dynamic AESA values, of which only two representative dynamic AESA values are shown (AESA$_{22A-DX}$ and AESA$_{22A-DY}$). Each dynamic AESA value in Table 70C is associated with an end node and, at least temporarily, with a connection endpoint of that end node. For sake of illustration, Table 70C shows as its second column the end node with which its dynamic AESA values are associated. This second column in not really necessary in Table 70C in view of the fact that call layer control process 52A knows to which end node the Table 70C pertains. The third column of Table 70C contains the particular connection endpoint with which each dynamic AESA is associated.

In accordance with operation of the third embodiment, as action 3-1 the call layer reserves a connection endpoint (e.g., connection endpoint 36A) in similar manner as with the previous embodiments (e.g., in response to a request (action 3-0) by device 24A to set up a call with device 24B). Then, as action 3-2, the call layer control process 52A obtains an available one of the dynamic AESAs from Table 70C for the call, and for that available dynamic AESA stores in its third column an identifier for the connection endpoint (connection endpoint 36A) involved in the call for the calling party. For the example shown in FIG. 3, the call layer control process 52A obtains from Table 70C the dynamic AESA having the value AESA$_{22A-DX}$).

As action 3-3 the call layer control process 52A of the end node 22A transmits a call layer signaling message to end node 22B. In this second embodiment of the invention, the call layer signaling message 80(3) of action 3-3 includes the dynamic AESA value. Again, the call layer signaling message 80(3) of action 2-3 can take the form(s) as described above.

Upon receipt of the call layer signaling message 80(3), as action 3-4 the call layer control process 52B of end node 22B reserves a connection endpoint for the call to device 24B. As illustrated in FIG. 3, the particular connection endpoint reserved by action 2-4 is connection endpoint 36B. Thereafter, as action 3-5, the call layer control process 52B sends a connection request message to the connection layer. The connection request message sent to the connection layer as action 3-5 includes the dynamic AESA (e.g., the dynamic AESA having the value AESA$_{22A-DX}$ in the present example). As a result of receipt of the connection request of action 3-5, as action 3-6 the connection layer control process 42B handles the extension terminal 34B and through connects switch 32B so that endpoint 36B is connected to extension terminal 34B.

Action 3-7 involves the routing of connection layer signaling through the connection layer from end node end node 22B to end node 22A. The connection layer signaling, depicted as message 82(3) in FIG. 3, includes the dynamic AESA. In fact, the dynamic AESA is used as the end node address for routing the connection layer signaling. Upon receipt of the connection layer signaling (e.g., message 82(3)), as reflected by action 3-8A the connection layer control process 42A in the connection layer sends the dynamic AESA value to the call layer control process 52A. The call layer control process 52A can then check Table 70C to determined which connection endpoint is currently specified by the received dynamic AESA, and returns to connection layer control process 42A an identification of the appropriate connection endpoint as action 3-8B. The connection layer control process 42A then uses the connection endpoint identifier to issue a command (action 3-9) to switch 32A so as to through connect the ATM switch to the connection endpoint, e.g., to the connection endpoint 36A for device 24A.

In the above description of the third embodiment, a dynamic AESA value has been employed for sake of illustration. It should be understood that a routing number other than an AESA can be utilized for the third embodiment consistent with the principles summarized above.

Fourth Embodiment

The fourth example embodiment is illustrated in FIG. 4, which again employs similarly referenced elements as FIG. 1. In the fourth embodiment, connection endpoint information for a first connection end point of a first end node of the network is included in a vacant or otherwise unused field in an ATM end system address (AESA) of the first end node. In like manner as previous embodiment, the connection layer signaling is routed to the first end node from a second end node. The connection layer signaling of the fourth embodiment includes the AESA of the first end node, which also includes the connection endpoint information. At the first end node, the connection endpoint information for the first connection end point of the first end node (included in the AESA of the first end node) is used to through connect the ATM switch in the physical layer to the first connection endpoint.

In accordance with operation of the fourth embodiment, as action 4-1 the call layer reserves a connection endpoint (e.g., connection endpoint 36A) in similar manner as with the previous embodiments (e.g., in response to a request (action 4-0) by device 24A to set up a call with device 24B). Then, as action 4-2, the call layer control process 52A associates a connection endpoint identifier with the connection endpoint. For sake of illustration, in FIG. 4 the connection endpoint identifier $CEI_{36}$ is assigned for connection endpoint 36A. As part of action 4-2, call layer control process 52A prepares a call layer signaling message to be transmitted to end node 22B. The AESA for the end node 22A is to be included in the call layer signaling message of the fourth embodiment. However, in the fourth embodiment the call layer control process 52A includes the connection endpoint identifier for the connection endpoint for the calling party in an empty or vacant field of the AESA for end node 22A. In particular, in the present example the connection endpoint identifier $CEI_{36}$ is included in a vacant field of the AESA for end node 22A. An example vacant field could be, for example, an ESI field when using the AESA E.164 address format.

Figure 4:
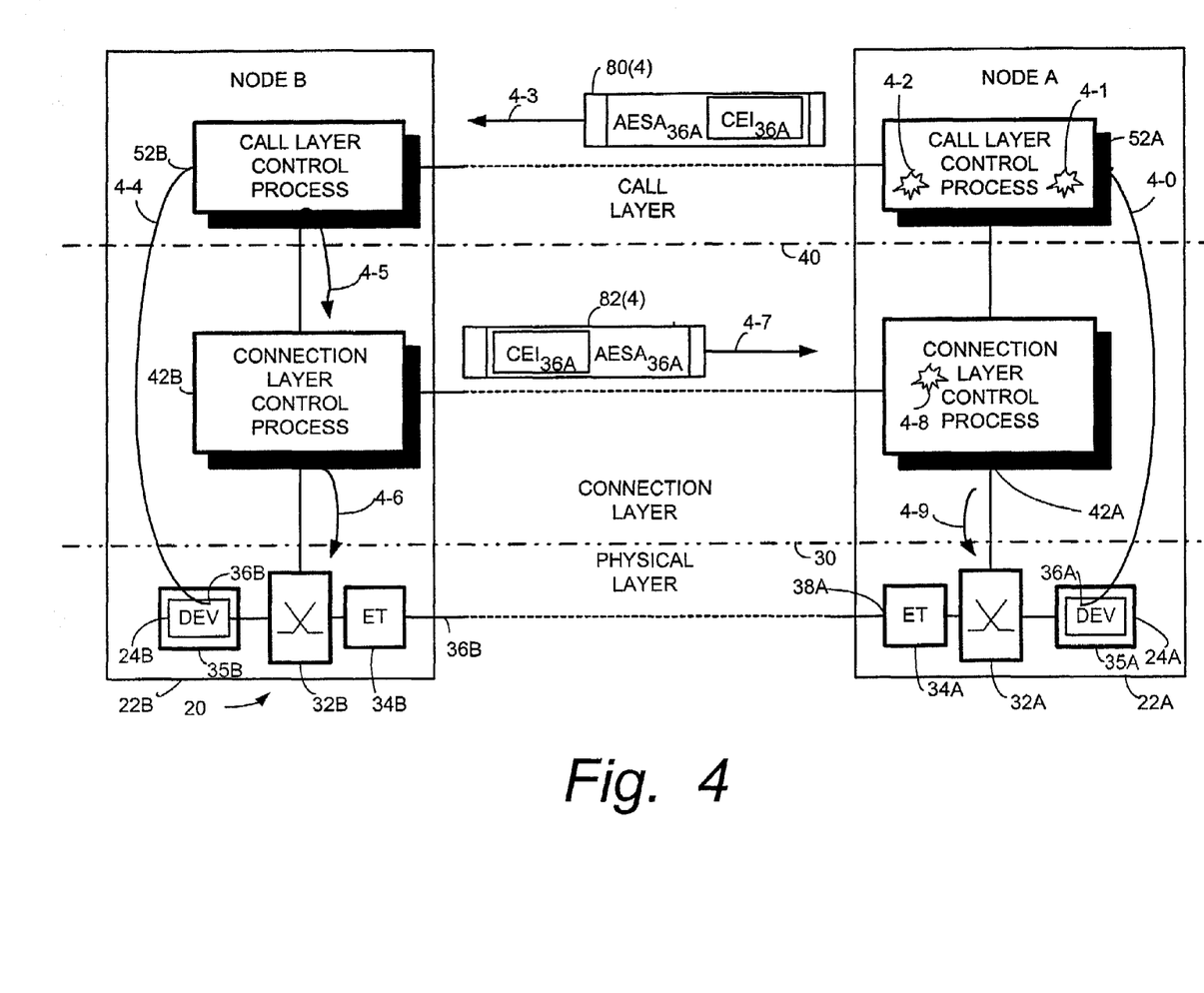
FIG. 4 is a diagrammatic view of a telecommunications network utilizing a call layer and connection layer binding scheme according to a fourth embodiment of the invention.

As action 4-3 the call layer control process 52A of the end node 22A transmits the call layer signaling message to end node 22B. As shown in FIG. 4, in this fourth embodiment of the invention the call layer signaling message 80(4) of action 4-3 includes the AESA for the first end node, and further includes in that AESA the connection endpoint identifier $CEI_{36}$ for the first connection endpoint.

Upon receipt of the call layer signaling message 80(4), as action 4-4 the call layer control process 52B of end node 22B reserves a connection endpoint for the call to device 24B. As illustrated in FIG. 4, the particular connection endpoint reserved by action 4-4 is connection endpoint 36B. Thereafter, as action 4-5, the call layer control process 52B sends a connection request message to the connection layer. The connection request message sent to the connection layer as action 4-5 includes the AESA of the end node 22A (which includes, e.g., connection endpoint identifier $CEI_{36}$ for the first connection endpoint). As a result of receipt of the connection request of action 4-5, as action 4-6 the connection layer control process 42B handles the extension terminal 34B and through connects switch 32B so that endpoint 36B is connected to extension terminal 34B.

Action 4-7 involves the routing of connection layer signaling through the connection layer from end node end node 22B to end node 22A. The connection layer signaling, depicted as message 82(4) in FIG. 4, includes the AESA for the end node 22A (which includes, e.g., connection endpoint identifier $CEI_{36}$ for the first connection endpoint). In fact, the AESA for end node 22A is used for routing the connection layer signaling.

Upon receipt of the connection layer signaling (e.g., message 82(4)), as reflected by action 4-8 the connection layer control process 42A in the connection layer unpacks the AESA for end node 22A, and obtains therefrom the connection endpoint identifier $CEI_{36}$ for the first connection endpoint. The connection layer control process 42A then uses the connection endpoint identifier to issue a command (action 4-9) to switch 32A so as to through connect the ATM switch to the connection endpoint, e.g., to the connection endpoint 36A for device 24A.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a telecommunications network having a physical layer which includes Asynchronous Transfer Mode (ATM) entities, a call layer, and a connection layer, with a separation between the call layer and the connection layer whereby the call layer and the connection layer utilize differing signaling entities in the physical layer, a method comprising:

at a first end node of the network, making an association of binding information with connection endpoint information for a first connection end point at the first end node of the network;

in the call layer, transmitting the binding information and an ATM end system address (AESA) of the first end node to a second end node of the network;

reserving a second connection end point at the second end node;

sending a connection request from the call layer to the connection layer, the connection request including the binding information and the AESA of the first end node;

routing connection layer signaling through the connection layer to the first end node;

at the first end node, using the binding information included in the connection layer signaling to obtain the connection endpoint information for the first connection end point.

2. The method of claim 1, further comprising making the association in only one of the call layer and the connection layer whereby the association is known only in the layer in which the association is made.

3. The method of claim 2, further comprising:

making the association in the connection layer; and the call layer obtaining the binding information from the connection layer.

4. The method of claim 1, wherein the step of using the binding information to obtain the connection endpoint information for the first connection end point involves, at the first end node, transmitting the binding information to the call layer and at the call layer obtaining the connection endpoint information for the first connection endpoint.

5. The method of claim 4, further comprising the call layer ordering the connection layer to through connect a switch in the physical layer of the first end node in accordance with the connection endpoint information for the first connection endpoint.

6. The method of claim 1, further comprising through connecting a switch in the physical layer of the first end node in accordance with the connection endpoint information for the first connection endpoint.

7. The method of claim 1, wherein the connection endpoint information for the first connection end point at the first end node of the network is vendor specific for a physical layer entity at the first end node.

8. The method of claim 7, wherein the connection endpoint information is a concatenation of one or more of a node identifier, a hardware cabinet rack, a hardware slot, a hardware port, and a resource.

9. For use in a telecommunications network having a physical layer which includes Asynchronous Transfer Mode (ATM) entities, a call layer, and a connection layer, with a separation between the call layer and the connection layer whereby the call layer and the connection layer utilize differing signaling entities in the physical layer, a method comprising:
   in the call layer, transmitting an ATM end system address (AESA) from a first end node of the network to a second end node of the network, the ATM end system address (AESA) being for a first connection end point at the first end node;
   reserving a second connection end point at the second end node;
   sending a connection request from the call layer to the connection layer, the connection request including the ATM end system address (AESA) for the first connection end point at the first end node;
   routing connection layer signaling through the connection layer to the first end node using the ATM end system address (AESA) for the first connection end point at the first end node;
   at the first end node, using the ATM end system address (AESA) for the first connection end point at the first end node included in the connection layer signaling to through connect an ATM switch in the physical layer to the first connection endpoint.

10. For use in a telecommunications network having a physical layer which includes Asynchronous Transfer Mode (ATM) entities, a call layer, and a connection layer, with a separation between the call layer and the connection layer whereby the call layer and the connection layer utilize differing signaling entities in the physical layer, a method comprising:
   at a first node of the network, associating a dynamic routing number both with the first end node of the network and with a first connection end point at the first end node;
   in the call layer, transmitting the dynamic routing number to a second end node of the network;
   reserving a second connection end point at the second end node;
   sending a connection request from the call layer to the connection layer, the connection request including the dynamic routing number;
   routing connection layer signaling through the connection layer to the first end node;
   at the first end node, using the dynamic routing number included in the connection layer signaling to obtain the first connection end point.

11. The method of claim 10, wherein the routing number is an ATM end system address (AESA).

12. The method of claim 10, further comprising routing the connection layer signaling through the connection layer to the first end node using the dynamic routing number.

13. The method of claim 10, further comprising through connecting a switch in the physical layer of the first end node in accordance with the connection endpoint information for the first connection endpoint.

14. The method of claim 10, wherein the connection endpoint information for the first connection end point at the first end node of the network is vendor specific for a physical layer entity at the first end node.

15. The method of claim 13, wherein the connection endpoint information is a concatenation of one or more of a node identifier, a hardware cabinet rack, a hardware slot, a hardware port, and a resource.

16. For use in a telecommunications network having a physical layer which includes Asynchronous Transfer Mode (ATM) entities, a connection layer, and a connection layer, with a separation between the call layer and the connection layer whereby the call layer and the connection layer utilize differing signaling entities in the physical layer, a method comprising:
   including connection endpoint information for a first connection end point of a first end node of the network in an ATM end system address (AESA) of the first end node;
   in the call layer, transmitting the ATM end system address (AESA) of the first end node to a second end node of the network;
   reserving a second connection end point at the second end node;
   sending a connection request from the call layer to the connection layer, the connection request including the ATM end system address (AESA) of the first end node;
   routing connection layer signaling through the connection layer to the first end node;
   at the first end node, using the connection endpoint information for the first connection end point of the first end node included in the ATM end system address (AESA) of the first end node to through connect an ATM switch in the physical layer to the first connection endpoint.

17. The method of claim 16, further comprising including the connection endpoint information for the first connection end point of the first end node of the network in a vacant field or unused field of the ATM end system address (AESA) of the first end node.

18. The method of claim 16, wherein the connection endpoint information for the first connection end point at the first end node of the network is vendor specific for a physical layer entity at the first end node.

19. The method of claim 18, wherein the connection endpoint information is a concatenation of one or more of a node identifier, a hardware cabinet rack, a hardware slot, a hardware port, and a resource.

20. A telecommunications network including a first end node and a second end node which are connected by separated call and connection layers, wherein the first end node transmits an ATM end system address (AESA), the ATM end system address (AESA) being for a first connection end point at the first end node, so that upon receipt of connection layer signaling routed through the connection layer from the second end node to the first end node using the ATM end system address (AESA) for the first connection end point at the first end node, the first end node uses the the ATM end system address (AESA) for the first connection end point at the first end node to through connect an ATM switch in the physical layer to the first connection endpoint.

21. The method of claim 10, further performing the associating in only one of the call layer and the connection layer, resulting in an association which is known only in the layer in which the association is made.

* * * * *